United States Patent [19]

Kawakami

[11] Patent Number: 5,181,125
[45] Date of Patent: Jan. 19, 1993

[54] APPARATUS FOR MUTING NOISE RESULTING FROM REPRODUCING OF A PCM AUDIO SIGNAL RECORDED IN AN EXTENSION OF A SLANT TRACK CONTAINING A RECORDED VIDEO SIGNAL

[75] Inventor: Hiroshi Kawakami, Tokyo, Japan
[73] Assignee: Sony Corporation, Tokyo, Japan
[21] Appl. No.: 757,232
[22] Filed: Sep. 10, 1991
[30] Foreign Application Priority Data Sep. 28, 1990 [JP] Japan .................................. 2-25968

[51] Int. Cl.⁵ .......................................... H04N 5/783
[52] U.S. Cl. .................................. 358/336; 358/314;
358/312; 360/10.3; 360/19.1; 360/38.1
[58] Field of Search ................ 358/314, 336, 341, 312,
358/335, 343; 360/19.1, 38.1, 10.3

[56] References Cited
U.S. PATENT DOCUMENTS 4,403,262  9/1983  Ito et al. ................................ 360/19.1
4,559,567 12/1985  Maruichi et al. ..................... 360/38.1
4,651,230  3/1987  Hagita et al. ........................ 358/314

Primary Examiner—Tommy P. Chin
Assistant Examiner—Huy Nguyen
Attorney, Agent, or Firm—Alvin Sinderbrand; William S. Frommer

[57] ABSTRACT

An apparatus for reproducing video signals recorded in slant tracks on a magnetic tape also having respective pulse code modulated audio signals recorded in extensions of the slant tracks with gaps therebetween: comprises a rotary head drum having magnetic heads mounted thereon with an angular spacing of 180 degrees therebetween for scanning the slant tracks and extensions thereof and thereby providing reproduced head outputs containing video and audio signals reproduced from the magnetic tape with dropouts in said reproduced head outputs corresponding to the gaps between the respective recorded video and audio signals; and a signal extracting circuit including a head changeover switch receiving the reproduced head outputs and responsive to a head switching signal synchronized with rotation of the head drum to provide a switched output which, in a normal reproducing mode employing a tape speed equal to that for recording, consists of the reproduced video signals and, in another reproducing mode employing a different tape speed, also includes the dropouts and noises corresponding to at least portions of the reproduced audio signals. Dropouts in the switched output are detected to provide dropout detected pulses, and the switched output is muted in response to muting signals each initiated by a respecitve dropout detected pulse and continuing for a period corresponding to the duration of the respective dropout and the following noise so as to eliminate from the switched output in the other reproducing mode noises due to audio signals that may be contained therein.

7 Claims, 5 Drawing Sheets

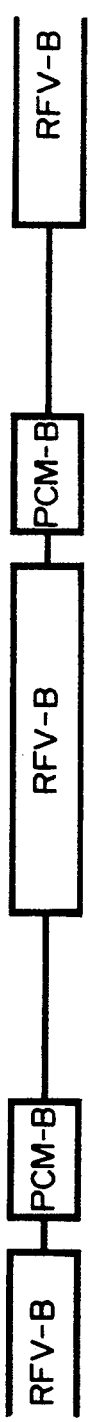
FIG. 2A (PRIOR ART)
FIG. 2B (PRIOR ART)
FIG. 2C (PRIOR ART)
FIG. 2D (PRIOR ART)
FIG. 2E (PRIOR ART)
FIG. 2F (PRIOR ART)
FIG. 2G (PRIOR ART)

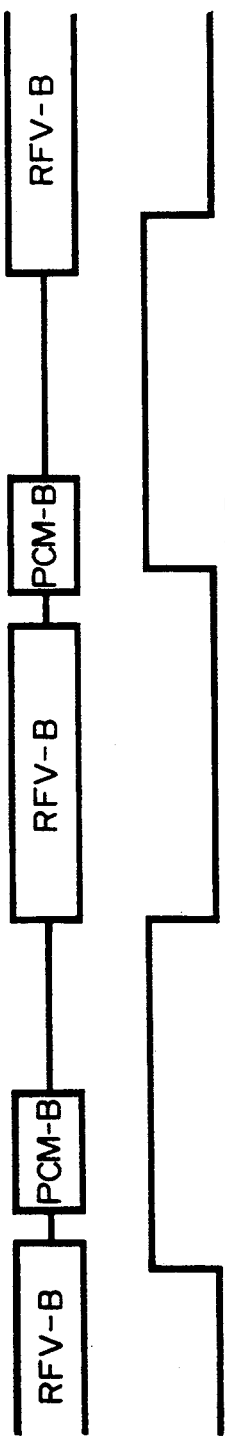
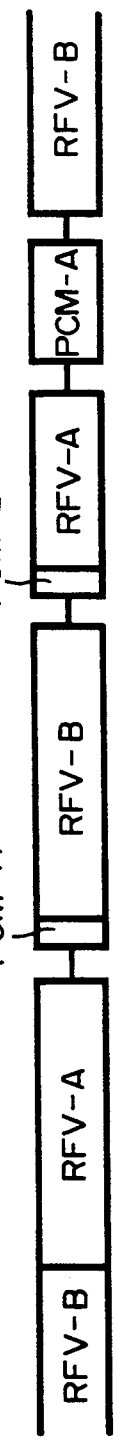
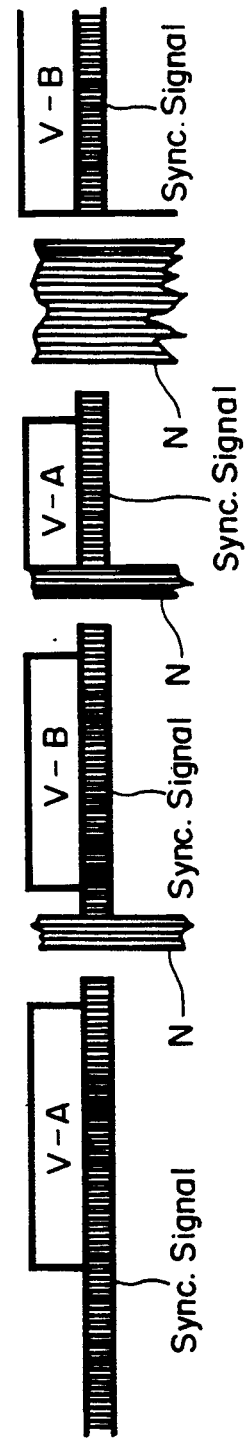
FIG. 2H (PRIOR ART)
FIG. 2I (PRIOR ART)
FIG. 2J (PRIOR ART)
FIG. 2K (PRIOR ART)

FIG. 4a
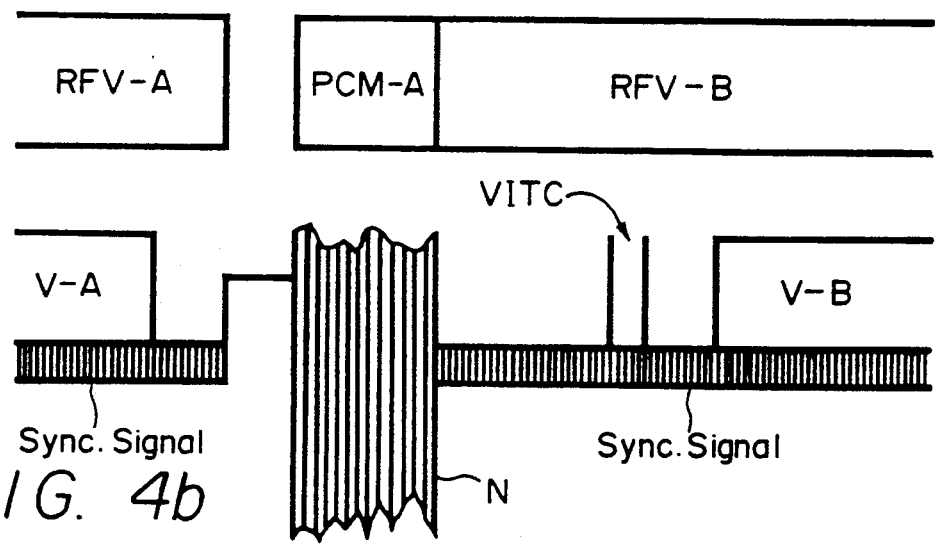
FIG. 4b
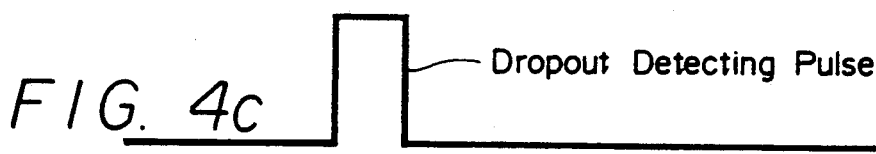
FIG. 4c
FIG. 4d
FIG. 4e
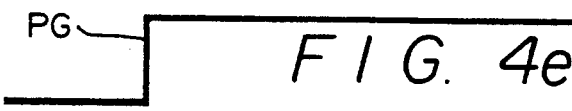
FIG. 4f
FIG. 4g
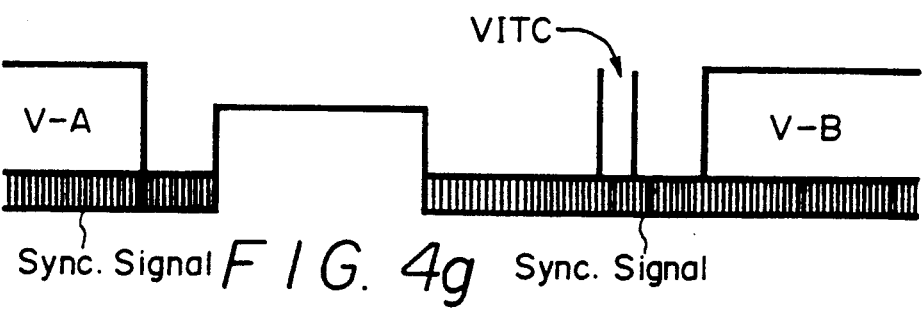

APPARATUS FOR MUTING NOISE RESULTING FROM REPRODUCING OF A PCM AUDIO SIGNAL RECORDED IN AN EXTENSION OF A SLANT TRACK CONTAINING A RECORDED VIDEO SIGNAL

BACKGROUND OF THE INVENTION

1. Field of the Invention

The present invention generally relates to apparatus for reproducing an information signal and, more particularly, is directed to an apparatus for reproducing a video signal with a pulse code modulated (PCM) audio signal.

2. Description of the Prior Art

The Betacam (registered trademark) video tape recorder (VTR) employs a tape guide drum assembly in which two pair of close together rotary magnetic heads are mounted on a rotary head drum with an angular spacing of substantially 180 degrees between the two pairs of heads and records a frequency-modulated (FM) luminance signal and chroma signals on a magnetic tape by means of the two pairs of close together rotary magnetic heads so as to form respective slant tracks.

In the Betacam SP type video tape recorder, as shown in FIG. 1, of the 2 channel audio tracks CH1, CH2 formed along one side edge of a magnetic tape 1 by the Betacam video tape recorder, the inside audio track CH1 is sacrificed for the recording therein of PCM audio signals $PA_1$, $PA_2$, $PB_1$, $PB_2$, . . . along extensions of the respective slant tracks in which the FM-modulated luminance and chroma signals YA, CA, YB, CB, . . . are recorded. Further, in FIG. 1, reference symbol TC represents a time code track formed along the side edge of the magnetic tape 1 remote from the tracks $CH_1$ and $CH_2$.

A playback operation of Betacam and Betacam SP type video tape recorders will now be described with reference to FIGS. 2A–2K and, in order to facilitate such description, it will be assumed that the Betacam and Betacam SP type video tape recorders employ a tape guide drum assembly in which a single pair of rotary magnetic heads are mounted on a rotary head drum with an angular spacing of substantially 180 degrees between the heads.

According to the Betacam video tape recorder, in the normal playback mode (i.e., the magnetic tape is transported at the same speed as for the recording mode), the signals reproduced by the pair of rotary magnetic heads are comprised of alternately reproduced, high frequency video signals RFV-A, RFV-B, each representing one field, as shown in FIGS. 2A, 2B. These high frequency video signals are supplied to a head change-over switch (not shown), in which they are switched by a switching signal shown in FIG. 2C to provide a continuous signal of high frequency video signals RFV-A, RFV-B alternating at every field, as shown in FIG. 2D.

According to the Betacam SP type video tape recorder, in the normal playback mode (i.e., the magnetic tape is transported at the same speed as for the recording mode), the reproduced signals by the pair of rotary magnetic are comprised of heads, a high frequency video signal RFV-A for one field and a related PCM audio signal PCM-A and a high frequency video signal RFV-B for another field and a related PCM audio signal PCM-B, as shown in FIGS. 2E, 2F when the reproduced signals are supplied to the head change-over switch, which is switched by the switching signal shown in FIG. 2C, the PCM audio signals PCM-A and PCM-B are dropped to provide a continuous signal of the high frequency video signals RFV-A, RFV-B for alternating fields, as shown in FIG. 2D similarly to the Betacam video tape recorder.

However, in the Betacam SP type video tape recorder, in the variable tape speed playback mode, a problem arises which will be explained with reference to the −1 time normal tape speed playback mode (that is, the playback mode in which the magnetic tape is transported at a speed −1 times the transport speed for the recording mode).

In the −1 times normal tape speed playback mode, the signals reproduced by the pair of rotary magnetic heads, that is, the high frequency video signals RFV-A, RFV-B for odd and even fields and the related PCM audio signals PCM-A, PCM-B are reproduced in reduced times, as shown in FIGS. 2G, 2H, while the timing of the switching pulse (see FIG. 2I) is constant regardless of the change of the transport speed of the magnetic tape. As a consequence, when the signals shown on FIGS. 2G and 2H to be reproduced by the pair of rotary magnetic heads, respectively, are supplied to and switched by the change-over switch, then the output of the change-over switch is composed of at least portions of audio signals PCM-A, PCM-B, as shown in FIG. 2J. Accordingly, if the output signal shown in FIG. 2J is FM-demodulated, then video signals V-A, V-B and a synchronizing (sync.) signal are obtained along with portions of the PCM audio signals PCM-A, PCM-B which are reproduced as large noises N, as shown in FIG. 2K.

OBJECTS AND SUMMARY OF THE INVENTION

Accordingly, it is an object of the present invention to provide an improved information signal reproducing apparatus in which the aforementioned shortcomings and disadvantages of the prior art can be eliminated.

More specifically, it is an object of the present invention to provide an information signal reproducing apparatus which can obtain a reproduced main information signal which does not include a reproduced auxiliary or sub information signal a even when a magnetic tape in the playback mode is transported at transport speed different from that of the recording mode.

It is another object of the present invention to provide an information signal reproducing apparatus, as aforesaid, and which can have a simplified circuit arrangement.

It is a further object of the present invention to provide an information signal reproducing apparatus, as aforesaid which can be suitably applied to a video tape recorder.

In accordance with an aspect of the present invention, in an apparatus for reproducing video or other main information signals recorded in slant tracks on a magnetic tape which further has pulse code modulated (PCM) audio or other auxiliary information signals recorded in extensions of the slant tracks with gaps between the recorded audio signals and the video signals recorded in the respective slant tracks, such apparatus having a normal reproducing mode in which the tape is advanced at a standard recording speed and another reproducing mode in which the tape is advanced at a speed different from the recording speed: there are provided rotary magnetic heads scanning the slant tracks and extensions thereof for providing reproduced head outputs containing the video and audio signals reproduced from the magnetic tape with dropouts in the reproduced head outputs corresponding to the gaps between the respective recorded video and audio signals; signal extracting means receiving the reproduced head outputs and being responsive to a head switching timing signal for providing an extracted output which, in the normal reproducing mode, consists of the reproduced video signals and, in the other reproducing mode, also includes the dropouts and noises corresponding to at least portions of the reproduced audio signals; a dropout detector responsive to the extracted output for detecting the dropouts therein and providing respective dropout detected pulse; muting means receiving the extracted output and being operative, in response to muting signals, for muting the extracted output; and means for generating each of the muting signals in response to a respective one of the dropout detected pulses so as to cause the muting means to be operative for a period corresponding to the direction of the respective dropout and the following noise so as to eliminate from the extracted output any noise due to the audio signals that may be contained therein.

BRIEF DESCRIPTION OF THE DRAWINGS

FIGS. 2A through 2K are timing charts of signals according to the example of the prior art;

FIGS. 4a through 4g are timing charts to which reference will be made in explaining operation of the information signal reproducing apparatus of FIG. 3.

DETAILED DESCRIPTION OF THE PREFERRED EMBODIMENT

Figure 1:
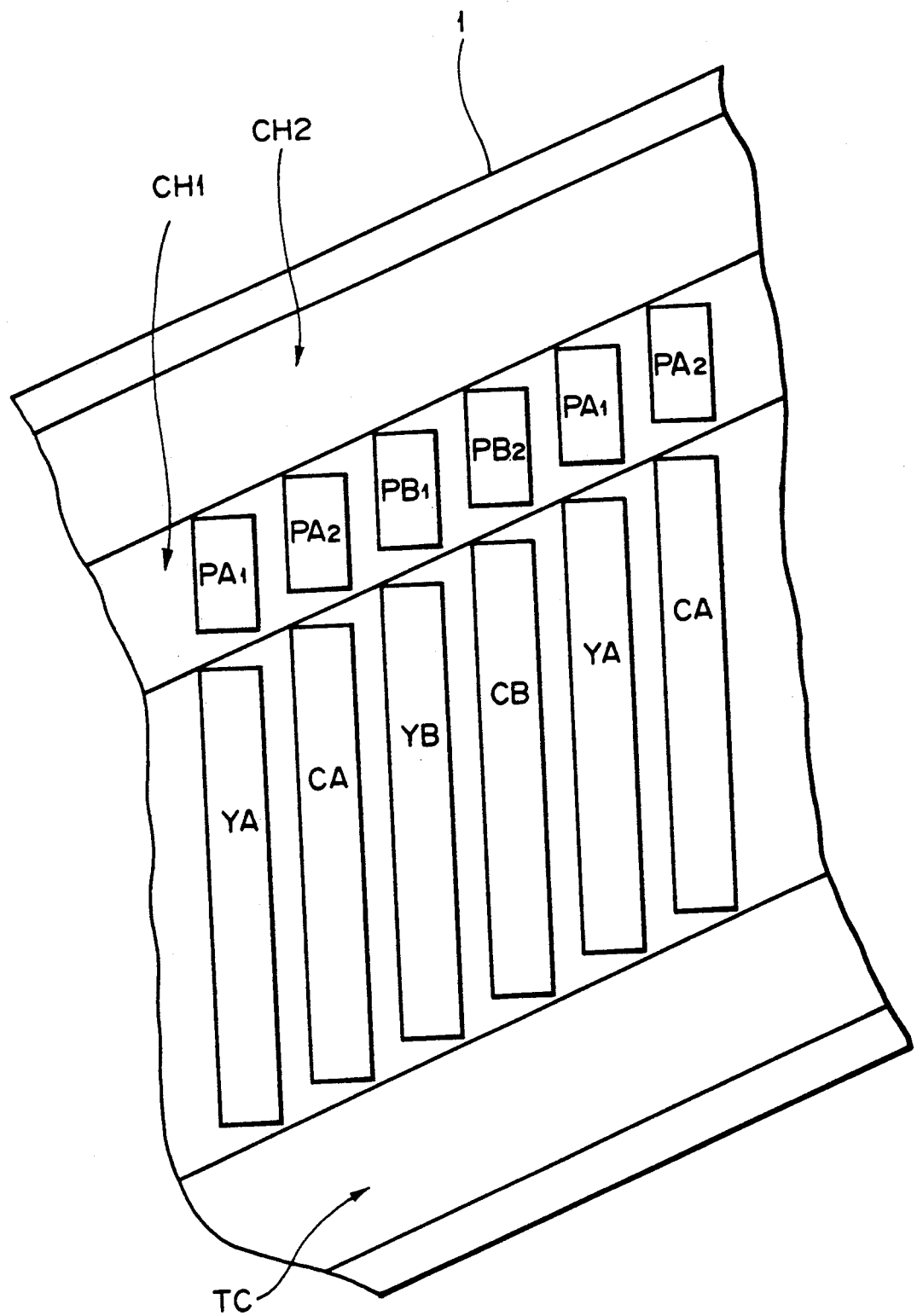
FIG. 1 is a schematic diagram showing track patterns formed on a magnetic tape by the Betacam video tape recorder and Betacam SP type video tape recorder.
Figure 3:
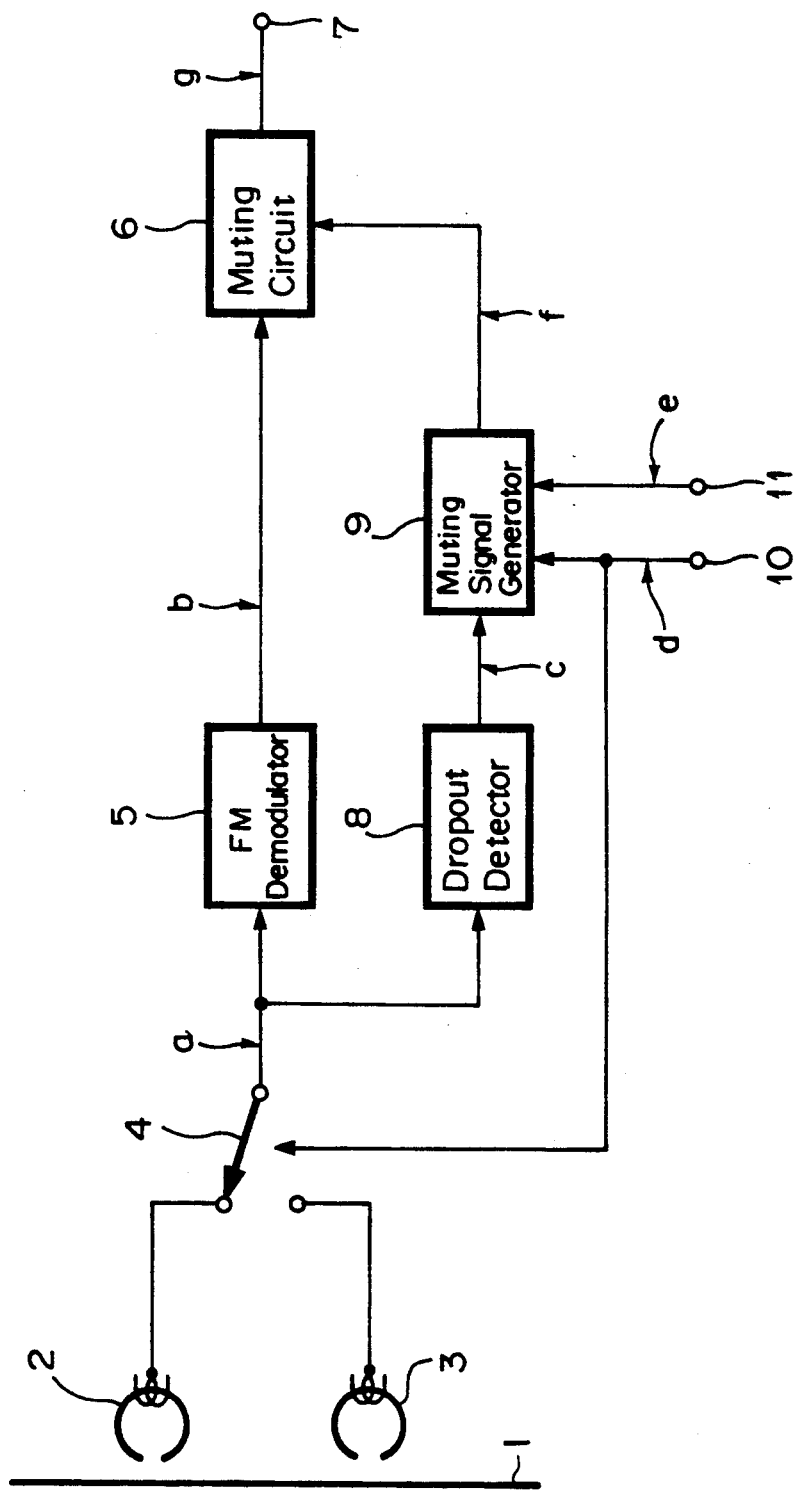
FIG. 3 is a block diagram showing an embodiment of an information signal reproducing apparatus according to the present invention.

An embodiment of the present invention will now be described with reference to FIG. 3 in which there is shown a magnetic tape 1 on which high frequency video signals RFV-A, RFV-B are recorded in slant tracks and PCM audio signals PCM-A, PCM-B are recorded in extensions of the slant tracks containing the recorded video signals RFV-A and RFV-B, respectively with a predetermined interval or gap between each recorded video signal and the related recorded PCM audio signal.

A pair of rotary magnetic heads 2 and 3 are mounted on a rotary head drum (not shown) with an angular spacing of substantially 180 degrees therebetween as described above and signals reproduced thereby are supplied to and switched by a head change-over switch 4 which acts as a signal extracting means in response to a head change-over switching pulse d (FIG. 4d) from an input terminal 10. As shown in FIG. 4a, the signal a output from the switch 4 is composed of high frequency video signals RFV-A, RFV-B temporally interleaved with PCM audio signals PCM-A, PCM-B which are each spaced by a predetermined time or interval from the preceding video signal RFV-A or RFV-B, respectively. This signal a is supplied to an FM-demodulator 5 and a drop-out detecting circuit 8.

The FM-demodulator 5 derives a signal b (FIG. 4b) formed of video signals V-A, V-B (including sync. signals) which result from FM-demodulating the high frequency video signals RFV-A, RFV-B. In the signal b, the portions of the signal a corresponding to the PCM audio signals PCM-A and PCM-B are reproduced as the noises N and signal b is supplied through a muting circuit 6 to an output terminal 7.

The dropout detecting circuit 8 derives a dropout detected pulse c (FIG. 4c) which corresponds to the interval between each high frequency video signal and the related PCM audio signal, for example, between the high frequency video signal RFV-A and the PCM audio signal PCM-A. The dropout detecting circuit 8 may also provide a dropout detected pulse, such as, when the rotary magnetic heads 2, 3 and the magnetic tape 1 are not in proper contact with each other or when a magnetic layer of the magnetic tape 1 has a defect, etc.

The drop-out pulse c from the dropout detecting circuit 8 is supplied to a muting signal generating circuit 9. The muting signal generating circuit 9 is further supplied with the switching pulse d from the input terminal 10 and with a PG pulse e (FIG. 4e) (i.e., a phase pulse of 30 Hz or 60 Hz generated in response to the rotation of the rotary drum) from an input terminal 11. The above-mentioned switching pulse d is generated on the basis of the PG pulse e for example, with a predetermined delay relative to the latter. Then, the muting signal generating circuit 9 generates a muting signal f, which is supplied to the muting circuit 6.

As shown in FIG. 4f, the muting signal f goes to a high level at the leading edge of the dropout detected pulse c (FIG. 4c) and goes to a low level at the leading edge of the switching pulse d. Further, the dropout detected pulse c which initiates this muting pulse f is discriminated from other dropout detected pulses by the PG pulse e. More specifically, as shown, the muting signal generator 9 initiates the muting pulse f only in response to a dropout detected pulse c which occurs in the interval between the rise or fall of the PG signal e and the rise or fall, respectively, of the switching pulse d. Therefore, the dropout detected pulse c can be derived from a dropout detector otherwise provided in the VTR.

The muting circuit 6 provides at the output side thereof a signal g shown in FIG. 4g. The signal g is composed of the video signals V-A, V-B (each including a sync. signal) and a VITC signal (a time code signal recorded on the slant track) and from which the noise N is removed unlike the signal in FIG. 4b.

Incidentally, the main and sub information signals may be a video signal, an audio signal, a data signal and so on or modulated signals of video, audio and data signals, frequency converted signals or the like. Also, the number of rotary magnetic heads is not limited to 1 or 2 and may be changed freely.

According to the present invention, as described above, an apparatus for reproducing video signals recorded in slant tracks on a magnetic tape which further has audio signals recorded in extensions of the slant tracks with predetermined gaps between the recorded video and audio signals, is provided with rotary magnetic heads scanning the slant tracks and the extensions thereof for providing reproduced head outputs containing the video and audio signals reproduced from the tape with dropouts therebetween corresponding to the gaps. The reproduced head outputs are supplied to a signal extracting circuit which includes a head-changing switch operated by a predetermined timing signal so that, in a normal reproducing mode, an extracted output is obtained which consists of the reproduced video signals and, in another reproducing mode having a different tape advancement speed, the extracted output also includes the dropouts and noises corresponding to at least portions of the reproduced audio signals.

In the muting circuit to which the extracted output from the extracting circuit is applied, a dropout detected pulse corresponding to the interval or gap on the slant track between the recorded video and audio signals is supplied to the muting signal generating circuit for generating the muting signal on the basis of the dropout detected pulse. In this case, the muting signal is supplied to the muting circuit which then mutes the head outputs corresponding to the reproduced audio signals so that, even when the magnetic tape is transported in playback mode a transport speed different from that used in the recording mode, it is possible to obtain the reproduced video or main information signal without the disturbance or noise due to the reproduced audio or auxiliary information signal.

When the muting signal is generated by using the dropout pulse or the like from existing circuits provided in the video tape recorder, the muting signal can be generated with ease and the muting circuit can have a simplified circuit arrangement. Further, the muting signal generator may receive an enabling pulse timed so that only dropout detected pulses which identify gaps between the recorded video and audio signals are operative to initiate the muting signal.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. An apparatus for reproducing main information signals recorded in slant tracks on a magnetic tape which further has respective auxiliary information signals recorded in extensions of the slant tracks with predetermined gaps between the recorded auxiliary information signals and the main informations signals recorded in the respective slant tracks, said apparatus having a normal reproducing mode in which the magnetic tape is advanced at a recording speed and another reproducing mode in which the magnetic tape is advanced at a speed different from said recording speed, said apparatus comprising:

rotary magnetic heads scanning said slant tracks and said extensions thereof for providing reproduced head outputs containing the main and auxiliary information signals reproduced from the magnetic tape with dropouts in said reproduced head outputs corresponding to the gaps between the respective recorded main and auxiliary information signals;

signal extracting means receiving said reproduced head outputs and being responsive to a predetermined timing signal for providing an extracted output which, in said normal reproducing mode, consists of said reproduced main information signals and, in said other reproducing mode, also includes said dropouts and noises corresponding to at least portions of the reproduced auxiliary information signals;

means responsive to said extracted output for detecting said dropouts therein and providing respective dropout detected pulses in said other reproducing mode;

muting means receiving said extracted output and being operative, in response to muting signals, for muting said extracted output; and means for generating each of said muting signals in response to a respective one of said dropout detected pulses so as to cause said muting means to be operative for a period corresponding to the duration of the respective dropout and the following noise so as to eliminate from the extracted output in said other reproducing mode said noises due to said auxiliary information signals contained therein.

2. An apparatus according to claim 1; wherein said rotary magnetic heads are mounted on a rotary head drum with an angular spacing of substantially 180 degrees therebetween.

3. An apparatus according to claim 2; wherein said signal extracting means includes a head change-over switch having inputs connected with said rotary magnetic heads, respectively, and an output terminal, and said predetermined timing signal is synchronized with rotation of said rotary head drum and actuates said head change-over switch for alternately connecting said inputs with said output terminal.

4. An apparatus according to claim 2; wherein said main information signals are video signals and said auxiliary information signals are pulse code modulated (PCM) audio signals.

5. An apparatus for reproducing video signals recorded in slant tracks on a magnetic tape which further has respective pulse code modulated audio signals recorded in extensions of the slant tracks with predetermined gaps between the recorded audio signals and the video signals recorded in the respective slant tracks, said apparatus having a normal reproducing mode in which the magnetic tape is advanced at a recording speed and another reproducing mode in which the magnetic tape is advanced at a speed different from said recording speed, said apparatus comprising:

a rotary head drum having magnetic heads mounted thereon with an angular spacing of 180 degrees therebetween for scanning said slant tracks and said extensions thereof and thereby providing reproduced head outputs containing video and audio signals reproduced from the magnetic tape with dropouts in said reproduced head outputs corresponding to the gaps between the respective recorded video and audio signals;

signal extracting means including head switching means receiving said reproduced head outputs and being responsive to a switching signal synchronized with rotation of said rotary head drum for providing a switched output which, in said normal reproducing mode, consists of said reproduced video signals and, in said other reproducing mode, also includes said dropouts and noises corresponding to at least portions of the reproduced audio signals;

means responsive to said switched output for detecting said dropouts therein and providing respective dropout detected pulses in said other reproducing mode;

muting means receiving said switched output and being operative, in response to muting signals, for muting said switched output; and means for generating each of said muting signals in response to a respective one of said dropout detected pulses so as to cause said muting means to be operative for a period corresponding to the duration of the respective dropout and the following noise so as to eliminate from the switched output in said other reproducing mode said noises due to said audio signals contained therein.

6. An apparatus according to claim 5; in which said recorded video signals are frequency modulated, and said signal extracting means further includes frequency demodulating means receiving said switched output for demodulating said frequency modulated video signals therein.

7. An apparatus according to claim 5; in which said switching signal is comprised of switching pulses each timed to occur as a respective one of said magnetic heads commences scanning of a respective one of said slant tracks, said means for generating said muting signals terminates each said muting signal at one of said switching pulses that occurs during the respective muting signal, said means for generating said muting signal further receives enabling pulses occurring predetermined times in advance of said switching pulses, and said means for generating the muting signal is responsive only to a dropout detected pulse occurring between an enabling pulse and a switching pulse.

* * * * *